(12) United States Patent
Friedrich

(10) Patent No.: US 6,727,337 B2
(45) Date of Patent: Apr. 27, 2004

(54) LOW LOSS OPTICAL MATERIAL

(75) Inventor: Reiner Friedrich, Hackett (AU)

(73) Assignee: The Australian National University, Canberra (AU)

( * ) Notice: Subject to any disclaimer, the term of this patent is extended or adjusted under 35 U.S.C. 154(b) by 62 days.

(21) Appl. No.: 10/151,710

(22) Filed: May 16, 2002

(65) Prior Publication Data

US 2003/0216537 A1 Nov. 20, 2003

(51) Int. Cl.⁷ .................. C08G 77/38; C08G 77/08; C08F 2/48
(52) U.S. Cl. ............... 528/24; 522/99; 528/34; 528/43
(58) Field of Search .............. 524/43, 34, 24; 522/99

(56) References Cited

U.S. PATENT DOCUMENTS

| 3,819,563 A | 6/1974 | Takago et al. |
| 4,831,174 A | 5/1989 | Elms |
| 4,960,847 A | 10/1990 | Arai et al. |
| 5,109,093 A | 4/1992 | Rees et al. |
| 5,883,214 A | 3/1999 | Wipfelder et al. |
| 5,973,176 A | 10/1999 | Roscher et al. |
| 6,020,450 A | 2/2000 | Matsuda et al. |

FOREIGN PATENT DOCUMENTS

| EP | 0 528 353 | 2/1993 |
| EP | 0 544 257 | 6/1993 |
| EP | 0 682 068 | 11/1995 |
| GB | 1 448 290 | 9/1976 |
| WO | WO 99/67318 | 12/1999 |
| WO | WO 01/04186 | 1/2001 |

*Primary Examiner*—Robert Dawson
*Assistant Examiner*—Marc S. Zimmer
(74) *Attorney, Agent, or Firm*—Morrison & Foerster LLP

(57) ABSTRACT

Storage stable, UV curable, NIR transparent, polycondensates and methods for the production thereof by condensation of one or more silanediols of formula (I) and/or derived precondensates thereof

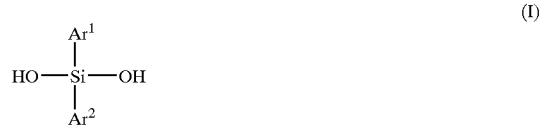

with one or more silanes of formula (II) and/or derived precondensates thereof

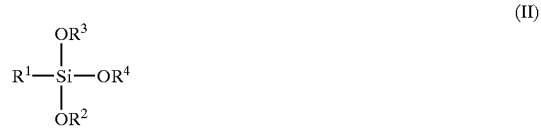

At least one of the aromatic groups $Ar^1$ or $Ar^2$ bears a cross-linkable functional group. The polycondensates are curable by crosslinking.

47 Claims, No Drawings

LOW LOSS OPTICAL MATERIAL

FIELD OF THE INVENTION

The invention relates to improvements in the performance of low loss optical materials resulting from chemical modification, and to improved polymeric siloxanes.

BACKGROUND OF THE INVENTION

Organically modified siloxanes (alternating Si—O backboned polymers) have a broad range of applications. In particular, they have good light transmission properties which make them ideal targets for use in optical materials such as optical fibres and devices. They also generally possess good adhesion as well as mechanical and chemical stability over an extended temperature range.

Siloxane polymers can be divided into two broad classes
(i) polysiloxanes prepared by the sol-gel route and
(ii) standard siloxane polymers of the polydiorganosiloxane type.

Polysiloxanes prepared by the sol-gel route are sometimes referred to as ORMOSIL (ORganically MOdified SILicates), ORMOCER (ORganically MOdified CERamics) or inorganic-organic hybrid polymers. These are formed from alkoxysilanes which are normally hydrolysed in the presence of base or acid to yield the corresponding silanol which then undergoes condensation to give a highly cross-linked polysiloxane.

Problematically, these polymers are difficult to process due to their high viscosity. While the condensation processes can be slowed down somewhat to assist in processing, there is always a tendency for such materials to condense so problems due to high viscosity are inevitable.

A further consequence of this unavoidable condensation is the formation of microgels. These microgels make filtration difficult, particularly the passage through 0.2 $\mu$m filters, a step which is essential in preparing optical materials to avoid scattering losses.

WO 01/04186 discloses a method for the condensation of diaryl silanediols with trialkoxy silanes. This method produces a polycondensate with the concomitant elimination of alcohol, according to the following scheme:

n Ar$_2$Si(OH)$_2$+n RSi(OR')$_3$→Polycondensate+2n R'OH

This synthetic route avoids the presence of large numbers of OH groups which have a high near IR absorption (3500 cm$^{-1}$) that impacts negatively upon optical transparency at 1550 nm. Uncondensed Si—OH groups can also continue a slow reaction over the service life of the polymeric material and lead to cracking and loss of adhesion.

It is desirable to cross-link polymer chains to provide greater chemical stability for the polymer matrix and more importantly to modify the physical properties of the polymer. The most important of these is the ability to cross-link to modify rheology, which in practical terms represents the ability to cure the material from a relatively low viscosity workable polymer to a polymer matrix with sufficient mechanical rigidity to allow use in applications such as optical devices.

WO 01/04186 discloses a number of cross-linking groups such as epoxy and acrylate groups which are pendant from the trialkoxy silane, RSi(OR')$_3$. There was little or no attention paid to groups which might advantageously provide controlled cross-linking based around the silane diol moiety.

The trialkoxy silane RSi(OR')$_3$ component is typically used for introducing functionality into the polymer, with the diaryl silane diol having two reactive OH groups and two "blocking" aryl moieties.

The approach disclosed in WO 01/04186 means that, for an alternating polymer, 50% of monomer units—the trialkoxy silane units—have to bear all the desired functionalities, for example, cross-linking, refractive index tuning and fluorination for lower optical loss. This approach is limiting in terms of the synthetic approaches which can be pursued.

It is an object of the present invention to provide polycondensates and polymeric matrices based on the above synthetic route, but which are more readily controlled in terms of structure and functionality.

SUMMARY OF THE INVENTION

According to a first aspect the invention provides a storage stable, UV curable, NIR transparent, polycondensate produced by condensation of one or more silanediols of formula (I) and/or derived precondensates thereof $$HO-\underset{\underset{Ar^2}{|}}{\overset{\overset{Ar^1}{|}}{Si}}-OH \qquad (I)$$

with one or more silanes of formula (II) and/or derived precondensates thereof $$R^1-\underset{\underset{OR^2}{|}}{\overset{\overset{OR^3}{|}}{Si}}-OR^4 \qquad (II)$$

wherein Ar$^1$ and Ar$^2$ are independently a group with 5 to 20 carbon atoms and at least one aromatic or heteroaromatic group and at least one of Ar$^1$ and Ar$^2$ bears a cross-linkable functional group; and R$^1$, R$^2$, R$^3$ and R$^4$ are independently alkyl, aralkyl or aryl with up to 20 carbon atoms.

Preferably in the present invention the ratio of formula (I) and formula (II) is 1:1.

The invention also provides a polycondensate of the structure $$*-\left[\underset{\underset{Ar^2}{|}}{\overset{\overset{Ar^1}{|}}{Si}}-O-\underset{\underset{\underset{R^2}{|}}{O}}{\overset{\overset{R^1}{|}}{Si}}-O\right]_q-*$$

wherein
Ar$^1$ and Ar$^2$ are independently a group with 5 to 20 carbon atoms and at least one aromatic or heteroaromatic group and at least one of Ar$^1$ and Ar$^2$ bears a cross-linkable group;
R$^1$ and R$^2$ are independently alkyl, aralkyl or aryl with up to 20 carbon atoms; and
q is at least 1.

According to a second aspect the invention provides a method of production of a polycondensate including the step of condensing one or more silanediols of formula (I) and/or a derived precondensates thereof

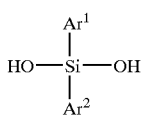

with one or more silanes of formula (II) and/or derived precondensates thereof

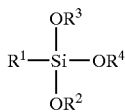

wherein $Ar^1$ and $Ar^2$ are independently a group with 5 to 20 carbon atoms and at least one aromatic or heteroaromatic group and at least one of $Ar^1$ and $Ar^2$ bears a cross-linkable functional group; and $R^1$, $R^2$, $R^3$ and $R^4$ are independently alkyl, aralkyl or aryl with up to 20 carbon atoms.

Preferably the molar ratio of formula (I): formula(II) is 1:1.

The invention also provides a method of preparing a polycondensate of the structure

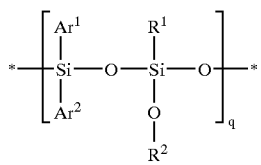

including the step of condensing one or more silanediols of formula (I) and/or derived precondensates thereof

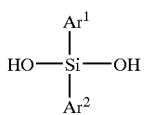

with one or more silanes of formula (II) and/or derived precondensates thereof

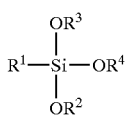

wherein $Ar^1$ and $Ar^2$ are independently a group with 5 to 20 carbon atoms and at least one aromatic or heteroaromatic group and at least one of $Ar^1$ and $Ar^2$ bears a cross-linkable functional group;

$R^1$, $R^2$, $R^3$ and $R^4$ are independently alkyl, aralkyl or aryl with up to 20 carbon atoms; and q is at least 1.

According to a third aspect the invention provides a monomer of formula (I)

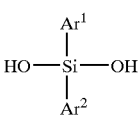

when used for the preparation of a storage stable, UV curable, NIR transparent, polycondensate wherein $Ar^1$ and $Ar^2$ are independently a group with 5 to 20 carbon atoms and at least one aromatic or heteroaromatic group and at least one of $Ar^1$ and $Ar^2$ bears a cross-linkable functional group.

According to a fourth aspect the invention provides a cured polycondensate prepared by curing a polycondensate according to the first aspect, or curing a polycondensate produced according to the second aspect, or curing a polycondensate which includes at least one monomer of the third aspect.

In the above compounds and methods, it is preferable if at least one of $Ar^1$ and $Ar^2$ is a moiety of the type

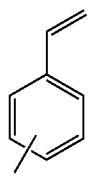

In alternative embodiments, at least one of $Ar^1$ and $Ar^2$ is substituted with an epoxy group or a double bond, for instance, an acrylate.

In alternative preferred embodiments, at least one of $Ar^1$ and $Ar^2$ is a moiety of the type

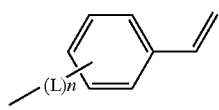

where L is a connecting group which is selected from alkyl, aralkyl, or ether;

n is 0–5; and $R^1$, $R^2$, $R^3$ and $R^4$ are independently alkyl, aralkyl or aryl with up to 20 carbon atoms.

Preferably L is selected from the group consisting of: —$CH_2$—, —($OCH_2$)— and —($OCH_2CH_2$)—.

Preferably at least one of $Ar^1$, $Ar^2$, $R^1$, $R^2$, $R^3$ and $R^4$ bears at least one fluorine as a substituent.

In alternative embodiments, at least one of $Ar^1$, $Ar^2$, $R^1$, $R^2$, $R^3$ and $R^4$ additionally bears at least one substituent selected from the group consisting of —OH, —SH and —$NH_2$.

In preferred embodiments, at least one of $Ar^1$ and $Ar^2$ is selected from the group consisting of:

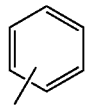 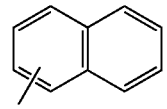

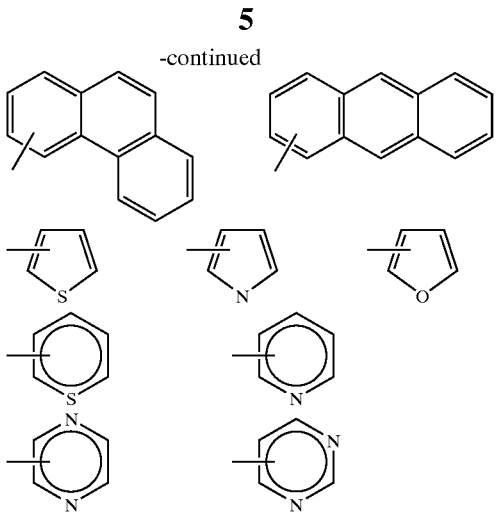

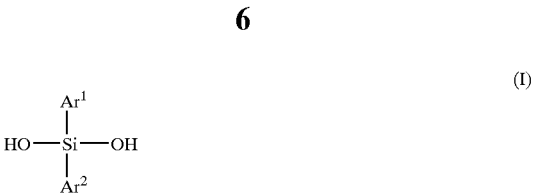

In one highly preferred embodiment, $Ar^1$ is phenyl and $Ar^2$ is 4-styryl. Preferably $R^1$ is selected from the group consisting of $CF_3(CH_2)_2-$, $CF_3(CF_2)_5(CH_2)_2-$, $CH_3(CH_2)_2-$, $-CH_3$ and phenyl.

Preferably $R^2$, $R^3$ and $R^4$ are independently selected from the group consisting of methyl, ethyl, propyl, butyl, pentyl, hexyl, heptyl and octyl.

In alternative preferred embodiments, up to 90 mol % of the silane of formula (II) is replaced with a co-condensable compound of boron, aluminum, silicon, germanium, titanium or zirconium.

In another alternative embodiment, up to 90 mol % of formula (I) is substituted with a non-cross-linkable compound, for example diphenyl silane diol.

It is preferred if the polycondensates according to the present invention are capable of being photo-structured in layers up to 150 μm in thickness.

In another aspect, the present invention provides a cured condensate and a method of preparing a cured polycondensate including the step of treating a polycondensate of the present invention with a curing agent.

In highly preferred embodiments the curing agent is light. A photoinitiator may be added.

Preferably, the light is UV light and the photoinitiator is selected from the group consisting of: 1-hydroxycyclohexylphenyl ketone, benzophenone, 2-chlorothioxanthone, 2-methylthioxanthone, 2-isopropylthioxanthone, benzoin, 4,4'-dimethoxybenzoin and mixtures thereof.

In an alternative preferred embodiment, the light is visible light and the photoinitiator may be, for example, camphorquinone.

In further alternative embodiments, other initiators may be added. These may be for example dibenzoyl peroxide, t-butyl perbenzoate and azobisisobutyronitrile.

Furthermore the resin can also be thermally cured using no initiator whatsoever.

The curing temperature is between 80–250° C. and more preferably between 170–210° C.

DETAILED DESCRIPTION OF THE INVENTION

The storage stable, UV curable, NIR transparent, polycondensate of the present invention is produced by condensation of one or more silanediols of formula (I) and/or derived precondensates thereof

with one or more silanes of formula (II) and/or derived precondensates thereof $$R^1-Si(OR^3)(OR^2)-OR^4 \quad (II)$$

wherein $Ar^1$ and $Ar^2$ are independently a group with 5 to 20 carbon atoms and at least one aromatic or heteroaromatic group and at least one of $Ar^1$ and $Ar^2$ bears a cross-linkable functional group; and $R^1$, $R^2$, $R^3$ and $R^4$ are independently alkyl, aralkyl or aryl with up to 20 carbon atoms.

Preferably, the molar ratio of formula (I) to formula (II) is 1:1.

The resultant polycondensate may be defined either in terms of the precondensate compounds used, or in terms of the structure of the polycondensate, which may be defined by the following structure

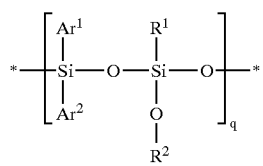

wherein $Ar^1$ and $Ar^2$ are independently a group with 5 to 20 carbon atoms and at least one aromatic or heteroaromatic group and at least one of $Ar^1$ and $Ar^2$ bears a cross-linkable group;

$R^1$ and $R^2$ are independently alkyl, aralkyl or aryl with up to 20 carbon atoms; and q is at least 1.

In the present invention, the aromatic groups $Ar^1$ and/or $Ar^2$ bear cross-linking functionalities, most commonly a double bond, such as that in a styrene or acrylate (where they are more reactive by conjugation), or epoxides. Each aromatic group may also bear more than one cross-linkable group, although it will be appreciated by those skilled in the art that precursors of such compounds may be difficult to process from a synthetic point of view.

The cross-linking group may be directly on the aromatic group, or any or all of the silicon atoms and the aromatic group and cross-linking functionality may be spaced apart with connecting groups, which may be inert or reactive as desired.

The cross linking group may be attached to the aromatic group by any intervening moiety.

Substitution of a hydrogen on any of the components with fluorine may take place in order to enhance the optical properties of the polycondensate and subsequently cured matrix.

Other reactive species, such as —OH, —SH and —NH$_2$ may also be present on one or more of the substituents, to facilitate additional chemistry of the matrix, polycondensate, oligomeric or monomeric species as desired.

In one highly preferred embodiment of the present invention, $Ar^1$ is phenyl and $Ar^2$ is 4-styryl. Preferably, $Ar^1$ and $Ar^2$ are not both 4-styryl.

In another alternative embodiment, up to 90 mol % of formula (I) is substituted with a non-cross-linkable compound, for example diphenyl silane diol.

As mentioned above, by placing the cross-linking function on the $Ar_2Si(OH)_2$ compound, the other 50% of monomer units (those of formula II) have one less burden to carry, leaving more of them available for other functions.

In this present improvement, the cross-linkable unit is placed on the $Ar_2Si(OH)_2$ compound, obviating the need for the $RSi(OR')_3$ compound to have any cross-linkable groups.

Also, having the cross-linking function on the $Ar_2Si(OH)_2$ compound generally means that a more thermally stable polymer results. For example, the use of styrene groups, highly preferred in the present invention, rather than the acrylate groups specifically recited and exemplified in WO 01/04186 results in a polymer in which the cross-links are via polystyrene type bonds. It will be appreciated by those skilled in the art that such bonds are more thermally stable that those in the corresponding polyacrylate cross-linked polymer.

The polycondensates of the present invention are described herein with reference to idealised structural representations, ie they are shown as alternating units. Those skilled in the art will appreciate that, in reality, the polymers themselves are statistical polymers and as such, will be unlikely to have only repeating units. It is not necessary that the monomer precursors are present in a 1:1 ratio although this is preferred.

Because the polymers of the present invention rely on cross-linking through the aryl group of the diaryl silane diol, the $RSi(OR')_3$ component can be varied or substituted for any co-condensable equivalent compound. Examples of alternative compounds have been provided in WO 01/04186. For production of the polymers of the present invention, at least a portion (up to 90%) of $RSi(OR')_3$ can be replaced by one or more co-condensable compounds of boron or aluminum of general formula (III). These substitutions may have the advantage of increasing chemical stability and mechanical hardness.

$$M(OR")_3 \qquad (III)$$

The groups R" are identical or different, M signifies boron or aluminum and R" represents an alkyl group with 1 to 4 carbon atoms. In the general formula (III), all three alkoxy groups can condense with compounds of general formula (I), so that only ⅔ of the molar quantity is required. The replacement compounds can be quite highly branched before cross-linking. Examples of compounds of general formula (III) are $Al(OCH_3)_3$, $Al(OC_2H_5)_3$, $Al(O-n-C_3H_7)_3$, $Al(O-i-C_3H_7)_3$, $Al(O-n-C_4H_9)_3$, $Al(O-i-C_4H_9)_3$, $Al(O-s-C_4H_9)_3$, $B(O-n-C_4H_9)_3$, $B(O-t-C_4H_9)_3$, $B(O-n-C_3H_7)_3$, $B(O-i-C_3H_7)_3$, $B(OCH_3)_3$ and $B(OC_2H_5)_3$.

Alternatively, at least a portion (up to 90%) of $RSi(OR)_3$ can be replaced by one or more co-condensable compounds of silicon, germanium, titanium or zirconium of general formula (IV).

$$M'(OR")_4 \qquad (IV)$$

The groups R" are identical or different, M' signifies silicon, germanium titanium or zirconium and R" represents an alkyl group with 1 to 4 carbon atoms. In the general formula (IV), all four alkoxy groups can condense with compounds of general formula (I), so two molecules of compound (II) may be replaced by one molecule of compound (IV). Examples of compounds of general formula (IV) include $Si(OCH_3)_4$, $Si(OC_2H_5)_4$, $Si(O-n-C_3H_7)_4$, $Si(O-i-C_3H_7)_4$, $Si(O-n-C_4H_9)_4$, $Si(O-i-C_4H_9)_4$, $Si(O-s-C_4H_9)_4$, $Ge(OCH_3)_4$, $Ge(OC_2H_5)_4$, $Ge(O-n-C_3H_7)_4$, $Ge(O-i-C_3H_7)_4$, $Ge(O-n-C_4H_9)_4$, $Ge(O-i-C_4H_9)_4$, $Ge(O-s-C_4H_9)_4$, $Ti(OCH_3)_4$, $Ti(OC_2H_5)_4$, $Ti(O-n-C_3H_7)_4$, $Ti(O-i-C_3H_7)_4$, $Ti(O-n-C_4H_9)_4$, $Ti(O-i-C_4H_9)_4$, $Ti(O-s-C_4H_9)_4$, $Zr(OCH_3)_4$, $Zr(OC_2H_5)_4$, $Zr(O-n-C_3H_7)_4$, $Zr(O-i-C_3H_7)_4$, $Zr(O-n-C_4H_9)_4$, $Zr(O-i-C_4H_9)_4$ and $Zr(O-s-C_4H_9)_4$.

The present invention allows for the substitution of these groups into the polycondensate without the requirement that they also provide cross-linking functionality, because this is provided via the functionalities pendant on the aromatic ring.

By substituting the compounds of general formula (II) by compounds of general formula (III) or (IV), the refractive index and optical attenuation of the resultant polycondensate can be tuned to a specific application. For example at certain wavelengths, alkyl-substituted components cause a reduction in refractive index while simultaneously increasing the attenuation where aryl-substituted components cause an increase in refractive index without significantly increasing the attenuation of the inventive material. Fluorination, by contrast, decreases both the refractive index and the attenuation of the inventive polycondensates.

Other resins, oligomers or monomers or particulate matter or other functional material may be added to the reaction mixture to modify the physical (refractive index), mechanical (hardness, thermal expansion profile) or chemical (introduction of reactive moieties) properties of the resulting polycondensate.

Other non-cross-linkable moieties, for example diphenyl silane diol, may be added to the mixture prior to condensation. This can be added to statistically space the number of cross-linking units on the chain. These units are typically less expensive than cross-linkable units and may be used where sufficient rigidity can be achieved without cross-linking of all the potential cross-linking units in the polycondensate. For example, if sufficient hardness is achieved when 10% of the polymer groups are cross-linked, then up to 90% of the cross-linkable groups may be replaced with non-cross-linkable groups. These non-cross-linkable groups can also be used to introduce additional functionality into the polycondensate.

To initiate or accelerate the condensation, Lewis or Bronstead bases can be added. Some examples are amines, e.g. N-methyl imidazole, benzyldimethylamine, triethylamine, ammonium fluoride or one or more alkaline earth hydroxides. The alkaline earth hydroxide barium hydroxide is particularly preferred. Insoluble bases are recommended because they have the advantage that they can be readily removed from the mixture by filtration after condensation. Aluminum or zirconium alkoxides can be used in place of the abovementioned bases for the condensation.

The polycondensates of the present invention have good storage stability, ie they do not gel or cross-link when maintained in the appropriate conditions (ie away from polymerisation sources).

The polycondensates of the present invention are UV curable and transparent in the NIR, especially at the wavelengths of 1310 nm and 1550 nm which are critical for optical applications. Curing, i.e. cross-linking proceeds with little associated shrinkage, meaning cracking in the bulk cured material can be avoided (cracking causes discontinuities in the material, making it unsuitable for optical data transmission).

The polycondensates of the present invention are photostructurable in layers of thickness up to 150 μm without loss of quality, making them suitable for application as photoresists, negative resists, dielectrics, light guides, transparent materials, or as photo-structurable materials.

Before curing and further processing, a solvent can be added to the polycondensate if desired and, if necessary, a suitable initiator can be added. In the curing processes, the C=C double bonds or the epoxy groups are linked together, many from different polycondensate chains, and the organic polymer matrix is constructed. Because of the relatively high molecular weight of the inventive polycondensates, curing proceeds with only minimal shrinkage.

It is also possible to add further polymerisable components before curing, for example, acrylates or methacrylates, or styrene compounds (to space polymer chains) where the polymerisation proceeds across the C=C double bonds, or compounds containing ring systems that are polymerisable by cationic ring opening.

Photoinitiators or thermal initiators may be added to increase the rate of curing. Commercially available photoinitiators include 1-hydroxycyclohexylphenyl ketone, benzophenone, 2-chlorothioxanthone, 2-methylthioxanthone, 2-iso-propylthioxanthone, benzoin, 4,4'-dimethoxybenzoin etc. For curing with visible light, the initiator may be for example camphorquinone.

For thermal initiators, organic peroxides in the form of peroxides (e.g. dibenzoyl peroxide), peroxydicarbonates, peresters (t-butyl perbenzoate), perketals, hydroperoxides may also be used. AIBN (azobisisobutyronitrile) may also be used.

Radiation cure, for example by gamma rays or electron beam, is also possible.

EXAMPLES

The invention will be further illustrated by the following examples which are intended to be illustrative, but not limiting.

Sample Preparation and Measurement

All resins described in Examples 1–7 were filtered through a 0.2 μm filter after preparation.

The optical loss was measured with a SHIMADZU UV-VIS-NIR spectrophotometer (UV-3101 PC) using a 0.5 cm quartz cuvette. Since the resins are colourless the absorption was calibrated using the zero absorption area ≤700 nm as baseline. The absorption spectrum from the resin was measured from 3200 nm–200 nm. The lowest absorption value (usually the absorption between 700 and 550 nm is a straight line if there is no scattering as a result of particles and if the resin is colourless) is set as 0 absorption. The loss in dB/cm is calculated from the optical density of the resin at 1310 and 1550 nm, multiplied by 10 and divided by the thickness of the cuvette in cm (whereas the optical density equals the log to the base 10 of the reciprocal of the transmittance). The loss was estimated from the un-cured resin only.

The refractive index was estimated by a standard refractometer using daylight as the light source.

Synthesis

Synthesis of 4-vinyldiphenylsilanediol

A 500 ml three neck round bottom flask equipped with a nitrogen inlet, stirrer and condenser was charged with 19.00 g (0.78 mol) magnesium turnings. Under a nitrogen atmosphere 125 ml of anhydrous THF and 125 ml of anhydrous diethylether were added followed by 98.75 g (0.71 mol) of 4-chlorostyrene. The mixture was kept at 50° C. for 16 h, to form the Grignard solution.

A two liter three neck round bottom flask equipped with a nitrogen inlet, dropping funnel and condenser was charged with 423.86 g (2.14 mol) phenyltrimethoxysilane. The system was purged with nitrogen and the Grignard solution was transferred into the dropping funnel. The flask was heated to 50° C., then the Grignard solution was added over a period of 40 min and kept at this temperature for an additional 2 h.

The reaction was allowed to cool to room temperature, 1 liter of petroleum ether was added, the precipitated salt was separated by filtration and the solvent was distilled off.

The product was distilled under reduced pressure using 2.00 g of 2-methyl-1,4-naphthoquinone and 2.00 g N,N-diphenylhydroxylamine as polymerisation inhibitors.

Yield: 64%=122.73 g (0.45 mol) 4-vinyldiphenyldimethoxysilane (bp.112–118° C.@2.5*10$^{-2}$ mbar).

160.00 g (0.59 mol) 4-vinyldiphenyldimethoxysilane was dissolved in 400 ml isopropanol and 125 ml 1 M acetic acid was added. The solution was stirred at room temperature for 48 h and 300 ml of the solvents were distilled off. The solution was neutralised with saturated NaHCO$_3$ and extracted twice with 200 ml ethyl acetate. The combined organic layer was dried over MgSO$_4$ and the solvents distilled off under reduced pressure. The crude product was ground and extracted with petroleum ether in a Soxhlet apparatus.

Yield: 63%=89.87 g (0.371 mol) 4-vinyldiphenylsilanediol.

Synthesis of resins with the general structure

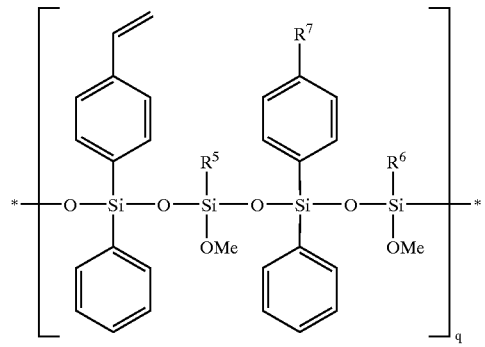

Example 1

($R^5$, $R^6$=CF$_3$(CH$_2$)$_2$—, $R^7$=H)

3.63 g (15 mmol) 4-vinyldiphenylsilanediol (VDPS), 3.25 g (15 mmol) of diphenylsilanediol (DPS) and 6.55 g (30 mmol) 3,3,3-trifluoropropyltrimethoxysilane were placed in a 50 ml round bottom flask equipped with a magnetic stirrer bar and condenser. 0.015 g (0.06 mmol) Ba(OH)$_2$.H$_2$O was added and the flask was placed immediately in an 80° C. oilbath. A condenser was placed on the flask and the reaction mixture was stirred thoroughly.

After a few minutes the solution became clear and reflux of methanol started.

After 15 min at 80° C. the flask was transferred to a rotary evaporator and the solvent distilled off at 80° C. under 640 mbar pressure for 40 min. Then the pressure was reduced to 10 mbar and the resin kept at 80° C. for an additional 1 h. The product was filtered through a 0.2 μm filter and used without any further purification.

Selected Physical Properties:

Refractive index: $n_D^{22}$ 1.5153

Optical loss: 0.15 dB/cm@1310 nm, 0.30 dB/cm @1550 nm

Example 2
($R^5$, $R^6$=$CF_3(CF_2)_5(CH_2)_2$—, $R^7$=H)

9.69 g (40 mmol) VDPS 8.65 g (40 mmol) DPS 37.46 g (80 mmol) 1H,1H,2H,2H-Perfluorooctyltrimethoxysilane 50 mg (0.26 mmol) $Ba(OH)_2.H_2O$ Synthetic procedure was the same as for example 1.

Selected physical properties:

Refractive index: $n_D^{22}$ 1.4510

Optical loss: 0.13 dB/cm @1310 nm, 0.25 dB/cm @1550 nm

Example 3
($R^5$, $R^6$=$CH_3(CH_2)_2$—, $R^7$=H)

3.63 g (15 mmol) VDPS 3.25 g (15 mmol) DPS 4.94 g (30 mmol) n-propyltrimethoxysilane 14 mg (0.06 mmol) $Ba(OH)_2.H_2O$ Synthetic procedure was the same as for example 1.

Selected physical properties:

Refractive index: $n_D^{22}$ 1.5481

Optical loss: 0.17 dB/cm @1310 nm, 0.34 dB/cm @1550 nm

Example 4
($R^5$, $R^6$=$CH_3$—, $R^7$=H)

4.85 g (20 mmol) VDPS 4.32 g (20 mmol) DPS 5.45 g (40 mmol) methyltrimethoxysilane 25 mg (0.08 mmol) $Ba(OH)_2.H_2O$ Synthetic procedure was the same as for example 1.

Selected physical properties:

Refractive index: $n_D^{22}$ 1.5609

Optical loss: 0.17 dB/cm @1310 nm, 0.43 dB/cm @1550 nm

Example 5
($R^5$=$CF_3(CF_2)_5(CH_2)_2$—, $R^6$=Ph, $R^7$=H)

2.42 g (10 mmol) VDPS 2.16 g (10 mmol) DPS 4.68 g (10 mmol) 1H,1H,2H,2H-perfluorooctyltrimethoxysilane 1.98 g (10 mmol) phenyltrimethoxysilane 8 mg (0.04 mmol) $Ba(OH)_2.H_2O$ Synthetic procedure was the same as for example 1.

Selected physical properties:

Refractive index: $n_D^{22}$ 1.4980

Optical loss: 0.13 dB/cm @1310 nm, 0.25 dB/cm @1550 nm

Example 6
($R^5$, $R^6$=$CF_3(CH_2)_2$—, $R^7$=$H_2C$=CH—)

5.00 g (21 mmol) VDPS 4.50 g (21 mmol) 3,3,3-trifluorotrimethoxysilane 8 mg (0.04 mmol) $Ba(OH)_2.H_2O$ Synthetic procedure was the same as for example 1.

Selected physical properties:

Refractive index: $n_D^{23}$ 1.5246

Optical loss: 0.16 dB/cm @1310 nm, 0.35 dB/cm @1550 nm

Example 7
($R^5$, $R^6$=Ph, $R^7$=$H_2C$=CH—)

7.27 g (30 mmol) VDPS 5.95 g (30 mmol) phenyltrimethoxysilane 25 mg (0.12 mmol) $Ba(OH)_2.H_2O$ Synthetic procedure was the same as for example 1.

Selected physical properties:

Refractive index: $n_D^{25}$ 1.5953

Optical loss: 0.19 dB/cm@1310 nm, 0.32 dB/cm@1550 nm

Curing

The material produced in example 1 was mixed with 2% Irgacure 1000 as photoinitiator and stirred under the exclusion of light for 24 hours. 2 ml of this mixture was spun onto a 10 cm Si-wafer at 4000 rpm for 60 s. The wafer was exposed to UV-light using a Hg arc lamp with 8 mW/cm² intensity for 60 s under a nitrogen atmosphere. The thickness of the film was 12.8 µm.

The invention has been described by reference to certain preferred embodiments; however, it should be understood that it may be embodied in other specific forms or variations thereof without departing from its spirit or essential characteristics. The embodiments described above are therefore considered to be illustrative in all respects and not restrictive, the scope of the invention being indicated by the appended claims rather than by the foregoing description.

What is claimed is:

1. A storage stable, UV curable, NIR transparent, polycondensate produced by condensation of one or more silanediols of formula (I) and/or derived precondensates thereof

with one or more silanes of formula (II) and/or derived precondensates thereof

wherein $Ar^1$ and $Ar^2$ are independently a group with 5 to 20 carbon atoms and at least one aromatic or heteroaromatic group and at least one of $Ar^1$ and $Ar^2$ bears a cross-linkable functional group; and $R^1$, $R^2$, $R^3$ and $R^4$ are independently alkyl, aralkyl or aryl with up to 20 carbon atoms.

2. A polycondensate according to claim 1 wherein at least one of $Ar^1$ and $Ar^2$ is a moiety of the type 3. A polycondensate according to claim 1 wherein the molar ratio of formula (I): formula (II) is 1:1.

4. A polycondensate according to claim 1 wherein at least one of $Ar^1$ and $Ar^2$ is substituted with an epoxy group or a double bond.

5. A polycondensate according to claim 4 wherein at least one of $Ar^1$ and $Ar^2$ is substituted with an acrylate.

6. A polycondensate according to claim 1 wherein at least one of $Ar^1$ and $Ar^2$ is a moiety of the type where L is a connecting group selected from alkyl, aralkyl, or ether; and
n is 0–5.

7. A polycondensate according to claim 6 wherein L is selected from the group consisting of: —CH$_2$—, —(OCH$_2$)— and —(OCH$_2$CH$_2$)—.

8. A polycondensate according to claim 1 wherein at least one of $Ar^1$, $Ar^2$, $R^1$, $R^2$, $R^3$ and $R^4$ bears at least one fluorine as a substituent.

9. A polycondensate according to claim 1 wherein at least one of $Ar^1$, $Ar^2$, $R^1$, $R^2$, $R^3$ and $R^4$ bears at least one substituent selected from the group consisting of —OH, —SH and —NH$_2$.

10. A polycondensate according to claim 1 wherein one of $Ar^1$ and $Ar^2$ is selected from the group consisting of:

11. A polycondensate according to claim 1 wherein $Ar^1$ is phenyl and $Ar^2$ is 4-styryl.

12. A polycondensate according to claim 1 wherein $R^1$ is selected from the group consisting of CF$_3$(CH$_2$)$_2$—, CF$_3$(CF$_2$)$_5$(CH$_2$)$_2$—, CH$_3$(CH$_2$)$_2$—, —CH$_3$ and phenyl.

13. A polycondensate according to claim 1 wherein $R^2$, $R^3$ and $R^4$ are independently selected from the group consisting of methyl, ethyl, propyl, butyl, pentyl, hexyl, heptyl and octyl.

14. A polycondensate according to claim 1 wherein up to 90 mol % of the silane of formula (II) is replaced with a co-condensable compound of boron, aluminum, silicon, germanium, titanium or zirconium.

15. A polycondensate according to claim 1 wherein up to 90 mol % of the silane diol of formula (I) is replaced with a non-cross-linkable compound.

16. A polycondensate according to claim 15 wherein the non-cross-linkable compound is diphenyl silane diol.

17. A method of production of a polycondensate by comprising condensing one or more silanediols of formula (I) and/or derived precondensates thereof $$\text{HO}-\underset{\underset{Ar^2}{|}}{\overset{\overset{Ar^1}{|}}{Si}}-\text{OH} \qquad (I)$$

with one or more silanes or formula (II) and/or derived precondensates thereof $$R^1-\underset{\underset{OR^2}{|}}{\overset{\overset{OR^3}{|}}{Si}}-OR^4 \qquad (II)$$

wherein $Ar^1$ and $Ar^2$ are independently a group with 5 to 20 carbon atoms and at least one aromatic or heteroaromatic group and at least one of $Ar^1$ and $Ar^2$ bears a cross-linkable functional group; and $R^1$, $R^2$, $R^3$ and $R^4$ are independently alkyl, aralkyl or aryl with up to 20 carbon atoms.

18. A monomer of formula (I)

$$\text{HO}-\underset{\underset{Ar^2}{|}}{\overset{\overset{Ar^1}{|}}{Si}}-\text{OH} \qquad (I)$$

wherein said monomer forms a polycondensate with one or more silanes of formula (II)

$$R^1-\underset{\underset{OR^2}{|}}{\overset{\overset{OR^3}{|}}{Si}}-OR^4 \qquad (II)$$

wherein $R^1$, $R^2$, $R^3$, and $R^4$ are independently alkyl, araalkyl, or aryl with up to 20 carbon atoms, said polycondensate being storage stable, UV curable, and NIR transparent wherein $Ar^1$ and $Ar^2$ are independently a group with 5 to 20 carbon atoms and at least one aromatic or heteroaromatic group and at least one of $Ar^1$ and $Ar^2$ bears a cross-linkable functional group.

19. A cured polycondensate prepared by curing a polycondensate including at least the monomer of claim 18.

20. A cured polycondensate prepared by curing a polycondensate according to claim 1.

21. A method of preparing a cured polycondensate including the step of treating a polycondensate according to claim 1 with a curing agent.

22. A method according to claim 21 wherein the curing agent is light.

23. A method according to claim 22 wherein the curing agent is light and a photoinitiator is added.

24. A method according to claim 23 wherein the light is UV light and the photoinitiator is selected from the group consisting of: 1-hydroxycyclohexylphenyl ketone, benzophenone, 2-chlorothioxanthone, 2-methylthioxanthone, 2-iso-propylthioxanthone, benzoin, 4,4'-dimethoxybenzoin and mixtures thereof.

25. A method according to claim 23 wherein the light is visible light and the photoinitiator is camphorquinone.

26. A method according to claim 21 wherein an initiator is added.

27. A method according to claim 26 wherein the initiator is dibenzoyl peroxide, t-butyl perbenzoate or azobisisobutyronitrile.

28. A polycondensate of the structure

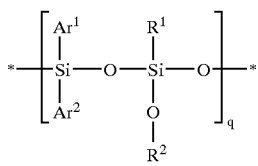

wherein

Ar$^1$ and Arare independently a group with 5 to 20 carbon atoms and at least one aromatic or heteroaromatic group and at least one of Ar$^1$ and Ar$^2$ bears a cross-linkable group;

R$^1$ and R$^2$ are independently alkyl, aralkyl or aryl with up to 20 carbon atoms; and q is at least 1.

29. A polycondensate according to claim 28 wherein at least one of Ar$^1$ and Ar$^2$ is a moiety of the type

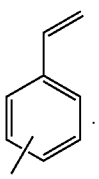

30. A polycondensate according to claim 28 wherein at least one of Ar$^1$ and Ar$^2$ is substituted with an epoxy group or a double bond.

31. A polycondensate according to claim 30 wherein at least one of Ar$^1$ and Ar$^2$ is substituted with an acrylate.

32. A polycondensate according to claim 28 wherein at least one of Ar$^1$ and Ar$^2$ is a moiety of the type

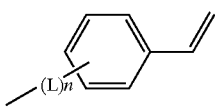

where L is a connecting group selected from alkyl, aralkyl, or ether; and n is 0–5.

33. A polycondensate according to claim 32 wherein L is selected from the group consisting of: —CH$_2$—, —(OCH$_2$)— and —(OCH$_2$CH$_2$)—.

34. A polycondensate according to claim 28 wherein at least one of Ar$^1$, Ar$^2$, R$^1$ and R$^2$ bears fluorine as a substituent.

35. A polycondensate according to claim 28 wherein at least one of Ar$^1$, Ar$^2$, R$^1$ and R$^2$ bears at least one substituent selected from the group consisting of —OH, —SH and —NH$_2$.

36. A polycondensate according to claim 28 wherein one of Ar$^1$ and Ar$^2$ is selected from

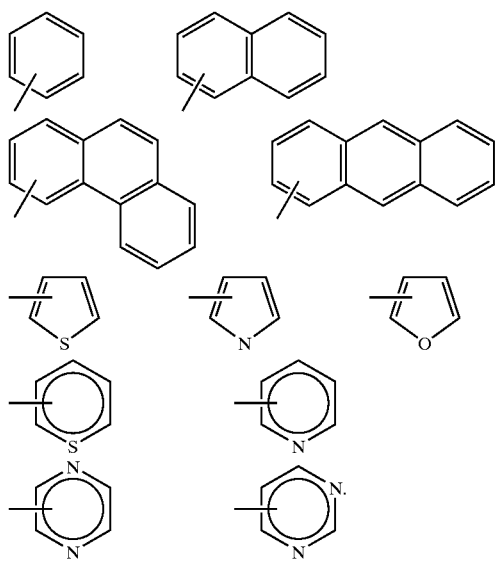

37. A polycondensate according to claim 28 wherein Ar$^1$ is phenyl and Ar$^2$ is 4-styryl.

38. A polycondensate according to claim 28 wherein R$^1$ is selected from the group consisting of CF$_3$(CH$_2$)$_2$—, CF$_3$(CF$_2$)$_5$(CH$_2$)$_2$—, CH$_3$(CH$_2$)$_2$—, —CH$_3$ and phenyl.

39. A polycondensate according to claim 28 wherein R$^2$ is selected from the group consisting of methyl, ethyl, propyl, butyl, pentyl, hexyl, heptyl and octyl.

40. A polycondensate according to claim 28 wherein up to 90 mol % of silane of formula (II) is replaced with a co-condensable compound of boron, aluminum, silicon, germanium, titanium or zirconium.

41. A polycondensate according to claim 28 wherein up to 90 mol % of the silane diol of formula (I) is replaced with a non-cross-linkable compound.

42. A polycondensate according to claim 41 wherein the non-cross-linkable compound is diphenyl silane diol.

43. A method of preparing a polycondensate of the structure

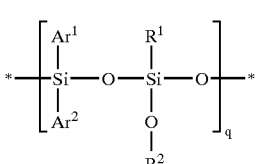

comprising condensing one or more silanediols of formula (I) and/or derived precondensates thereof

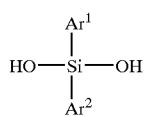

with one or more silanes of formula (II) and/or derived precondensates thereof

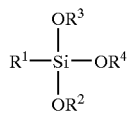

wherein $Ar^1$ and $Ar^2$ are independently a group with 5 to 20 carbon atoms and at least one aromatic or heteroaromatic group and at least one of $Ar^1$ and $Ar^2$ bears a cross-linkable functional group;

$R^1$, $R^2$, $R^3$ and $R^4$ are independently alkyl, aralkyl or aryl with up to 20 carbon atoms; and is at least 1.

44. A cured polycondensate prepared by curing a polycondensate according to claim 28.

45. A method of preparing a cured polycondensate comprising treating a polycondensate according to claim 28 with a curing agent.

46. A method according to claim 45 wherein the curing agent is light and a photoinitiator selected from the group consisting of 1-hydroxycyclohexylphenyl ketone, benzophenone, 2-chlorothioxanthone, 2-methylthioxanthone, 2-iso-propylthioxanthone, benzoin, 4,4'-dimethoxybenzoin, camphorquinone and mixtures thereof is added.

47. A method according to claim 45 wherein an initiator selected from dibenzoyl peroxide, t-butyl perbenzoate and azobisisobutyronitrile is added.

* * * * *